(12) United States Patent
Vennelakanti et al.

(10) Patent No.: US 9,129,604 B2
(45) Date of Patent: Sep. 8, 2015

(54) SYSTEM AND METHOD FOR USING INFORMATION FROM INTUITIVE MULTIMODAL INTERACTIONS FOR MEDIA TAGGING

(75) Inventors: Ramadevi Vennelakanti, Bangalore (IN); Prasenjit Dey, Bangalore (IN); Sriganesh Madhvanath, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 177 days.

(21) Appl. No.: 13/988,002

(22) PCT Filed: Nov. 16, 2010

(86) PCT No.: PCT/IN2010/000746
§ 371 (c)(1),
(2), (4) Date: May 16, 2013

(87) PCT Pub. No.: WO2012/066557
PCT Pub. Date: May 24, 2012

(65) Prior Publication Data
US 2013/0241834 A1    Sep. 19, 2013

(51) Int. Cl.
*G09F 5/00* (2006.01)
*G10L 15/22* (2006.01)
*G06F 3/01* (2006.01)
*G06F 17/30* (2006.01)
*G11B 27/28* (2006.01)
(Continued)

(52) U.S. Cl.
CPC ............... *G10L 15/22* (2013.01); *G06F 3/017* (2013.01); *G06F 17/274* (2013.01); *G06F 17/30038* (2013.01); *G11B 27/28* (2013.01); *G11B 27/3027* (2013.01); *G06F 3/167* (2013.01); *G10L 15/26* (2013.01); *G10L 2015/088* (2013.01)

(58) Field of Classification Search
CPC ... G06F 3/04842; G06F 3/017; G06F 3/0484; G06F 3/167; G06F 17/24; G06F 17/30058
See application file for complete search history.

(56) References Cited

U.S. PATENT DOCUMENTS 7,257,575 B1 *  8/2007  Johnston et al. ..................... 1/1
2004/0015398 A1  1/2004  Hayward
(Continued)

FOREIGN PATENT DOCUMENTS

| CN | 101419499 A | 4/2009 |
|----|-------------|--------|
| EP | 1324227     | 7/2003 |

(Continued)

OTHER PUBLICATIONS

Written opinion and international search report in corresponding PCT patent application, PCT/IN2010/000746, dated Sep. 1, 2011.
(Continued)

*Primary Examiner* — Lixi C Simpson
(74) *Attorney, Agent, or Firm* — Global IP Services

(57) ABSTRACT

System and method for using information extracted from intuitive multimodal interactions in the context of media for media tagging are disclosed. In one embodiment, multimodal information related to media is captured during multimodal interactions of a plurality of users. The multimodal information includes speech information and gesture information. Further, the multimodal information is analyzed to identify speech portions of interest. Furthermore, relevant tags for tagging the media are extracted from the speech portions of interest.

19 Claims, 3 Drawing Sheets

(51) Int. Cl.
*G11B 27/30* (2006.01)
*G06F 17/27* (2006.01)
*G06F 3/16* (2006.01)
*G10L 15/08* (2006.01)
*G10L 15/26* (2006.01)

(56) References Cited

U.S. PATENT DOCUMENTS

| | | |
|---|---|---|
| 2006/0242178 A1 | 10/2006 | Butterfield et al. |
| 2007/0239610 A1 | 10/2007 | Lemelson |
| 2007/0250526 A1 | 10/2007 | Hanna |
| 2007/0294273 A1 | 12/2007 | Benedeck et al. |
| 2008/0034374 A1 | 2/2008 | Davis |
| 2008/0109306 A1 | 5/2008 | Maigret et al. |
| 2008/0295126 A1 | 11/2008 | Lee et al. |
| 2008/0313570 A1 | 12/2008 | Shamma et al. |
| 2009/0138906 A1 | 5/2009 | Eide et al. |
| 2009/0192998 A1 | 7/2009 | Paulsen |
| 2010/0293187 A1 | 11/2010 | Biehn et al. |
| 2011/0109539 A1* | 5/2011 | Wu et al. ............ 345/156 |
| 2011/0304774 A1* | 12/2011 | Latta et al. .......... 348/699 |
| 2011/0313768 A1* | 12/2011 | Klein et al. .......... 704/251 |
| 2012/0016960 A1 | 1/2012 | Gelb et al. |
| 2012/0030637 A1* | 2/2012 | Dey et al. ............ 715/863 |

FOREIGN PATENT DOCUMENTS

| | | |
|---|---|---|
| EP | 1865426 | 12/2007 |
| WO | WO-2005052732 | 6/2005 |
| WO | WO-2009097337 | 8/2009 |

OTHER PUBLICATIONS

Zhao, W., Chellappa, R., Phillips, P. J., and Rosenfeld, A. 2003. "Face recognition: A literature survey". ACM Computing. Surveys 35, 4 (Dec. 2003), 399-458.

Cui, J., Wen, F., Xiao, R., Tian, Y., and Tang, X., "EasyAlbum: an interactive photo annotation system based on face clustering and re-ranking.", In Proceedings of the SIGCHI Conference on Human Factors in Computing Systems (San Jose, California, USA, Apr. 28-May 3, 2007). CHI '07. ACM, New York, NY, 367-376.

Supplementary European Search Report for EP Patent Application No. EP 09845128. European Patent Office. Aug. 28, 2013.

Girgensohn, A., Adcock, J., and Wilcox, L. , "Leveraging face recognition technology to find and organize photos." In Proceedings of the 6th ACM SIGMM international Workshop on Multimedia information Retrieval (New York, NY, USA, Oct. 15-16, 2004). MIR '04. ACM, New York, NY, 99-106.

International Search Report for PCT Application No. PCT/IN 2009/000304. Austrian Intellectual Property Office. Jul. 2, 2010.

Xiao, J. and Zhang, T. 2008. Face bubble: photo browsing by faces. In Proceedings of the Working Conference on Advanced Visual interfaces (Napoli, Italy, May 28-30, 2008). AVI '08. ACM, New York, NY, 343-346.

* cited by examiner

SYSTEM AND METHOD FOR USING INFORMATION FROM INTUITIVE MULTIMODAL INTERACTIONS FOR MEDIA TAGGING

BACKGROUND

Multi-modal sharing and organization of information between users has been, an area of research and study among the HCI community. Lot of work exists on annotation of media using implicit tags from natural interactions and the resulting systems are sometimes called observant systems. High quality tagging is critical for organizing the media and provides a great experience during its sharing and consumption. Lack of explicit tagging, for meta-data, by users on media is a well known problem for obvious reasons of tediousness and the lack of motivation. However, users commonly share the media with their friends and family on personal devices, such as PCs, mobiles, PDAs, and the like.

The conversations that happen, in the context of a shared media consumption scenario, are rich with content that is related to the media. Conversations around the media, say photos, for example, include who is in the photo, who took the photo, where and when it was taken and what happened around the photo and so on.

Existing methods for implicit tagging use information from only one of the modalities, such as speech or text, to tag the media. These methods use speech information for tagging media in both recognized speech mode or in un-recognized speech mode. The speech information may be captured from the discussions during sharing of the media in a multi-user scenario, or from the speech utterances by a user to describe the media. In recognized speech mode, a speech recognizer is used to convert the speech information to text and tag the media with the text information. In un-recognized speech mode, the speech information is used to tell a story about the media. In this case, the speech of a person trying to describe a photograph is attached to the photograph and whenever the photograph is viewed asynchronously, the speech can be listened to know more about the photograph.

However, the above existing methods also captures a lot of conversation that may not be related to the multimedia which if extracted to tag the media may lead to irrelevant tags and hence provides a dissatisfying user experience. The brute force way would be to try, recognize and interpret all the speech and then extract the tag information which is a very expensive method and may still result in a lot of irrelevant tags.

BRIEF DESCRIPTION OF THE DRAWINGS

Various embodiments are described herein with reference to the drawings, wherein.

Figure 1:
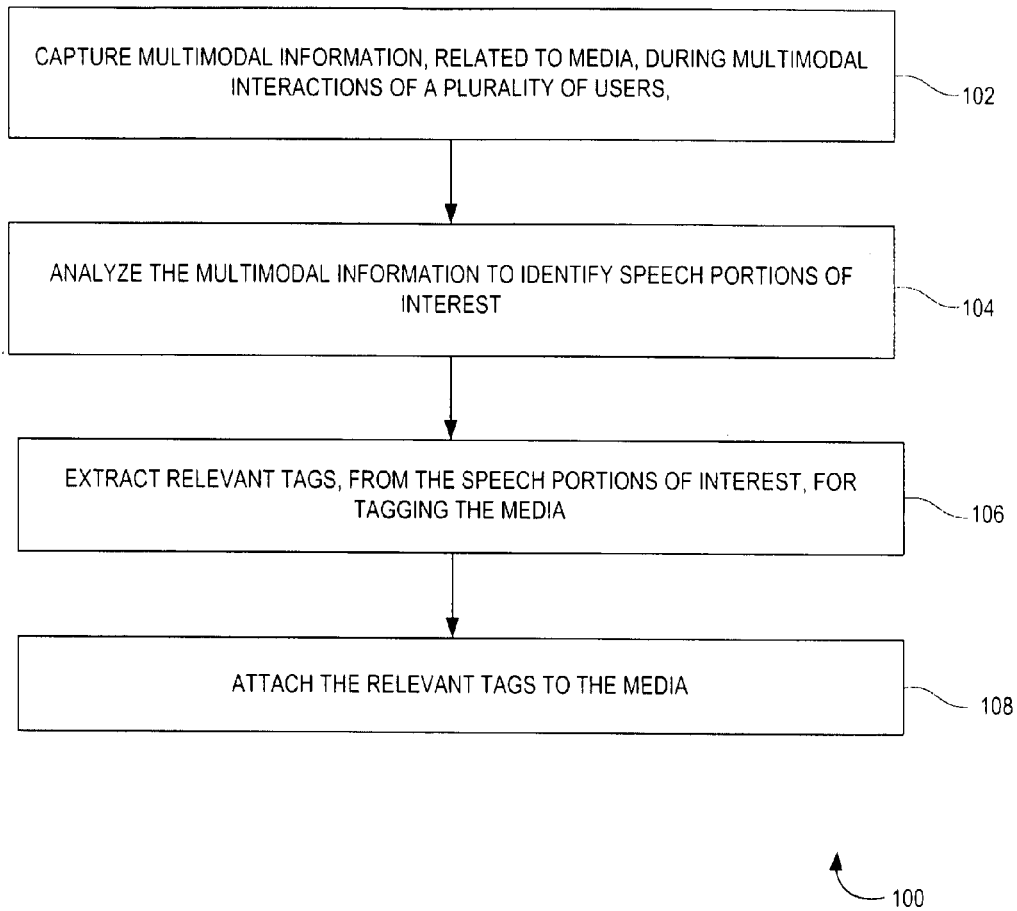
FIG. 1 is a flowchart illustrating a method of using multimodal information for media tagging, according to one embodiment.

The drawings described herein are for illustration purposes only and are not intended to limit the scope of the present subject matter in any way.

DETAILED DESCRIPTION

A system and method for using information from intuitive multimodal interactions for media tagging are disclosed. In the following detailed description of the embodiments of the present subject matter, reference is made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

The method and system described herein identify relevant speech portions that can be used as tags for media, for example photographs, based on semantics of multimodal interactions in the context of the media. In one embodiment, the information in the multimodal interactions includes gesture information and speech information. Further, the gesture information includes pointing gestures and/or face detection and recognition of users. Conversation that takes place in the context of the media interactions or multimodal interactions is an area rich with data that can be used to tag the media. For example, conversations around, say photos, rally around who is in the photo, who took the photo, where and when it was taken and what happened around the photo. If this speech information can be mined intelligently it would be easy to implicitly tag photographs from this natural conversation.

The present subject matter identifies the relevant speech portions of the recognized speech information of the conversation that happens in the context of the media, extracts the text from the relevant speech portions and uses the extracted text to tag the media. This can be done by matching the identified gesture information and speech information of the co-present conversation that co-occur when people take part in the co-present media sharing. Gesture speech co-occurrence and the presence of information relevant to the media that can be used as media tags was an identified pattern in a user research conducted to understand co-present media sharing interactions behavior and patterns. Further, the relevant speech portions are extracted from the recognized speech information using the co-occurrence of the gesture information and speech information (based on the mapping) and appropriate tags, for example name, subject, object, verb, and so on, for the media are extracted using Natural Language Understanding.

The terms "multimodal interaction" and "media interaction" are interchangeably used throughout the document. The term "image capturing device" refers to a camera used for capturing gestural information such as pointing gestures and face recognition of users during co-present multimodal interactions. Further, the term "audio capturing device" refers to a microphone used for capturing speech of users during co-present multimodal interactions. Furthermore, the term "multimodal information" refers to information extracted from intuitive multimodal interactions in the context of media.

FIG. 1 is a flowchart 100 illustrating a method of using multimodal information for media tagging, according to one embodiment. In one example embodiment, media includes photographs. Alternatively, the media can also include but not limited to video content, audio content, text content, images, and the like. At step 102, multimodal information is captured during multimodal interactions of a plurality of users. In one embodiment, the multimodal interactions take place between the users in the context of media. In other words, the multimodal information is related to the media and includes speech information and gesture information of the users. For example, the speech information may include conversation that takes place between the users in the context of the media. In one example embodiment, the gesture information may include pointing gestures of the users towards the media detected by an image capturing device mounted on a display device. In another example embodiment, the gesture information may also include at least one frontal face detected and recognized by the image capturing device mounted on the display device (i.e., recognizing frontal face of users as proxy for attention towards the computer). Further, the conversation of the frontal faces detected and recognized by the image capturing device can be captured using face recognition software, for example the face recognition software module 418 of FIG. 4, in the image capturing device. In this case, the display device provides an option to the user to select/lock the recognized face using a touch screen or an input device such as mouse or a keyboard. Hence, the speech of the selected user is captured.

At step 104, the multimodal information is analyzed to identify speech portions of interest. In these embodiments, the speech portions of interest are identified by analyzing the multimodal information to identify co-occurrence of the gesture information and the speech information, and identifying the speech portions of interest based on the identified co-occurrence of the gesture information and speech information.

In one example embodiment, the co-occurrence of the gesture information and speech information is identified as follows. User utterances during the multimodal interaction can be captured using the audio capturing device, for example microphone. Further, the gesture information such as pointing gestures is captured using the image capturing device, for example a camera, having gesture recognition software, for example gesture recognition software module 414 of FIG. 4. The captured speech information is analyzed for keywords such as that, this, who, what, when, where, he, she and so on. If a keyword is present, the gesture modality is looked at to see if a pointing gesture is present in an overlapping temporal window of the speech information. If a pointing gesture in gesture modality co-occurs with a keyword in speech modality, the recognized speech segments that contain the keywords can be considered as the speech portions of interest.

At step 106, relevant tags are extracted from the speech portions of interest for tagging the media. In this embodiment, it is determined whether the speech portions of interest can be recognized using speech recognition software, for example the speech recognition software module 416 of FIG. 4. If the speech portions of interest can be recognized using the speech recognition software, the speech portions of interest are converted to text in a natural language understanding format. Further, it is determined whether the relevant tags can be extracted from the text in the natural language understanding format. If the relevant tags can be extracted from the text in the natural language understanding format, then the relevant tags are extracted from the text in the natural language understanding format based on grammar parameters such as nouns, verbs, subject and object. In other words, the text of the speech portions of interest is subjected to natural language understanding and after the text has been subjected to the natural language understanding the relevant tags can be extracted based on nouns, verbs, subject, object and the like.

Further, if the relevant tags cannot be extracted from the text in the natural language understanding format, then the speech portions of interest corresponding to un-recognized text, in recorded format, are attached to the media. In these embodiments, if the natural language understanding may not be feasible, small portions of un-recognized speech can be stored with the media for consumption by other users, manual deciphering and tagging by other users, and/or editing or correction of existing tags in case of errors.

The steps for tagging the media when the natural language may not be feasible are as follows. The speech recognizer, for example the speech recognition software module 416 of FIG. 4, recognizes user utterances during the multimodal interaction. The gesture recognizer, for example the gesture recognition software module 414 of FIG. 4, recognizes pointing gesture of the users. The text of the recognized speech is analyzed for keywords such as that, this, who, where, when, what, he, she and so on. If a keyword is present, the gesture modality is looked at to see if a pointing gesture is present in an overlapping temporal window of the speech keyword happening. In these embodiments, a buffer window of speech is maintained. If a pointing gesture in gesture modality co-occurs with a spotted keyword in speech modality, the buffered speech for some (specified) time duration before and after the keyword time is taken for creating the speech "tag" to be attached to the media. The un-recognized recorded speech is stored as it is and displayed with the media for other users to listen to.

Furthermore, if the speech portions of interest cannot be recognized using the speech recognition software, one or more keywords are identified in the speech portions of interest using keyword spotting software. For example, the keywords include but not limited to what, where, who, when, this, he, she and that. Then, one or more gestures co-occurring substantially simultaneously with the identified keywords are identified. Furthermore, speech portions that occur substantially simultaneously around the keywords are stored based on the Identified gestures. Then, the stored speech portions in recorded format are attached to the media.

In these embodiments, the media can be tagged with small portions of recorded un-recognized speech by spotting the one or more keywords as follows. A keyword spotting software, for example the keyword spotting software module 420 of FIG. 4, spots for the keywords in the user utterances of during the multimodal interaction. The gesture recognizer recognizes pointing gestures of the users. If a keyword is present, the gesture modality is looked at to see if a pointing gesture is present in an overlapping temporal window of the speech keyword happening. In these embodiments, a buffer window of speech is maintained. If a pointing gesture in gesture modality co-occurs with a spotted keyword in speech modality, the buffered speech for some (or specified) time duration before and after the keyword is taken for creating the speech "tag" to be attached to the media. In addition, the un-recognized recorded speech is stored as it is and displayed with the media for other users to listen to. At step 108, the extracted relevant tags are attached to the media.

In accordance with above described embodiments with respect to FIG. 1, the gesture-speech patterns (i.e., co-occurrence of gesture and speech information in the multimodal information) occur when significantly relevant and important information is revealed about the media in the conversation that happens during co-present media sharing. The conversations may include queries from one user and reply to the queries from other users. For example, the conversations are often peppered with the gesture-speech patterns as shown in Table 1:

TABLE 1

| Questions | Gesture | Responses | Gesture | Possible Tags |
|---|---|---|---|---|
| Who is that? | Pointing | That is Ron | Pointing | Ron |
| Where is this? | Pointing | This is in Agra/ Taj Mahal | Pointing | Taj Mahal/ Agra |
| What is that? | Pointing | This is the Taj Mahal | Pointing | Taj Mahal |
| When was this? | | Last year/in August/at Don's wedding | | August, Don's Wedding |
| Have you seen this? | Pointing | Yes/No | | Seen by |
| Who is this? | Pointing | Don | | Don |

It is evident from the above example questions and their responses in Table 1, the co-occurrence of gesture-speech patterns include cues to spot the relevant portions of speech (i.e., speech portions of interest) to tag the media. The relevant portions of speech are often preceded by or succeeded by the "keywords" like What, Where, This, Who, When, That, He, She and the like and also accompanied with a "Pointing" gesture. The responses to these query keywords may include identifiers of the media object (i.e., relevant tag), for example name of the person, place or thing, the time or event or occasion, which can be extracted using the natural language understanding.

In another example, the presenter may offer information without any questions/queries. For example, the information statements may be as shown in the following table 2:

TABLE 2

| Statement | Gestures | Possible Tags |
|---|---|---|
| This is Don | Pointing | Don |
| This was at his wedding | Pointing | Wedding |
| This is the Taj Mahal | Pointing | Taj Mahal |
| That is Don's wife Shiela | Pointing | Shiela, Don's wife |

It is also evident from Table 2, the co-occurrence of gesture-speech patterns include cues to spot the relevant speech portion to tag the media. The relevant portions of speech (i.e., information statements) are often preceded by or succeeded by the "keywords" like This, That and the like and also accompanied with a "Pointing" gesture. The information statements may also include identifiers of the media object followed by the keyword, for example name of the person, place or thing, the time or event or occasion, which can be extracted using the natural language understanding.

Since the pointing or touching gesture is directed at the particular media object of discussion or specific speech portion of interest in the media object, the relevant speech portion can be generated for the whole media object or specific speech portion of interest of the content in the media object.

Multimodal interactions can be used to differentiate speech which may contain keywords but are not related to the media, for example users talking to each other about something not related to the media. The multimodal information that can be used to reject non-media relevant speech are as follows:
1. Presence of pointing towards the display of the computer by one or more users (as shown in FIG. 3).
2. Presence of at least one frontal face as user context detected by the camera mounted on the display (as shown in FIG. 2).

Figure 2:
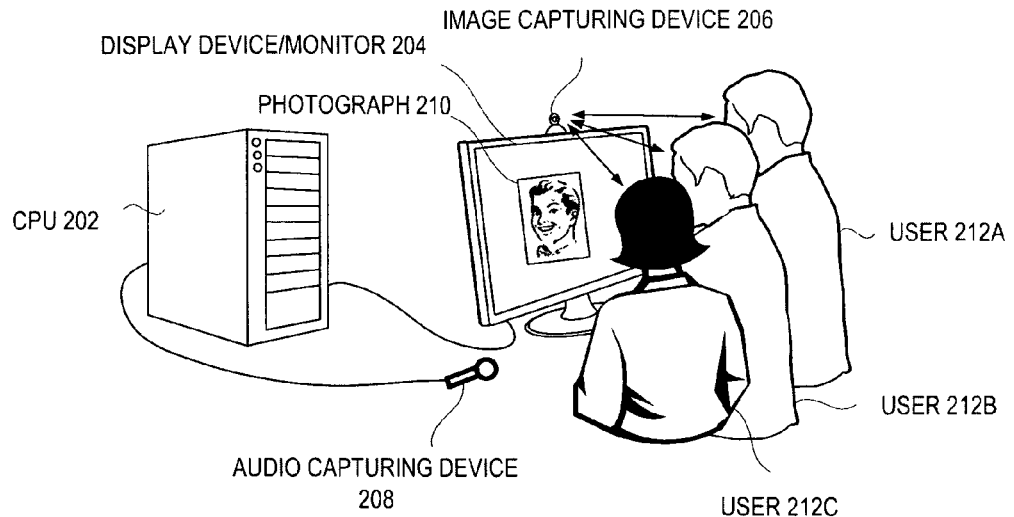
FIG. 2 illustrates an example diagram for capturing or recognizing at least one frontal face detected by an image capturing device mounted on a display device.
Figure 3:
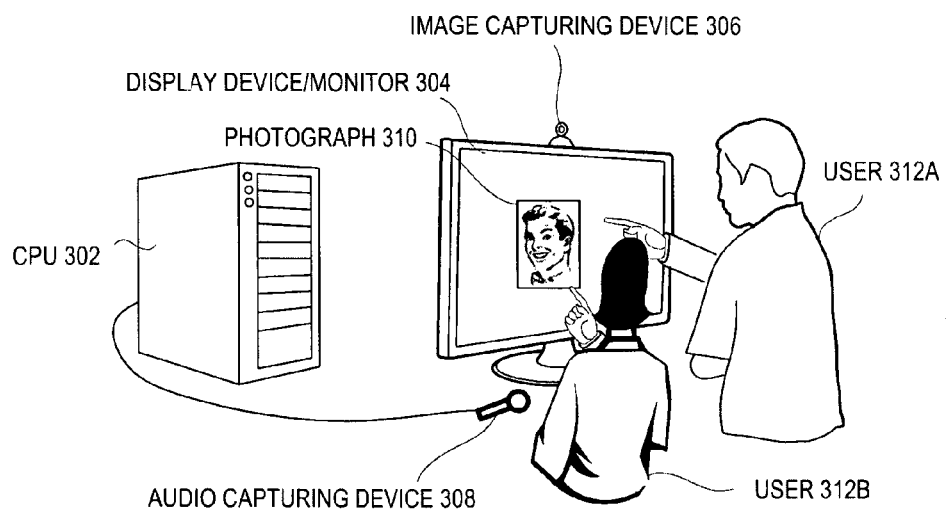
FIG. 3 illustrates an example diagram for capturing gesture information pointing towards the media detected by the image capturing device mounted on the display device.

FIG. 2 illustrates an example diagram 200 for capturing or recognizing at least one frontal face detected by an image capturing device 206 mounted on a display device 204. Particularly, FIG. 2 illustrates a CPU 202, the display device or monitor 204, the image capturing device 206, an audio capturing device 208, a photograph 210 displayed on the monitor 204, and a plurality of users 212A-C.

In the example embodiment illustrated in FIG. 2, the speech information related to the photograph 210 during its consumption and sharing by the plurality of users 212A-C is captured using the audio capturing device 208. Further, the face recognition software, for example the face recognition software module 418 of FIG. 4, recognizes the frontal face of the users 212A-C detected by the image capturing device 206 mounted on the display device 204. The display device 204 provides an option to the user to select at least one user from the users 212A-C using a touch screen or an input device such as mouse or a keyboard. In this case, the speech of the selected users is recognized by the audio capturing device 208.

FIG. 3 illustrates an example diagram 300 for capturing gesture information pointing towards the media detected by an image capturing device 306 mounted on a display device 304. Particularly, FIG. 3 illustrates a CPU 302, the display device or monitor 304, the image capturing device 306, an audio capturing device 308, a photograph 310 displayed on the monitor 304, and a plurality of users 312A-B.

In the example embodiment illustrated in FIG. 3, the speech information related to the photograph 310 during its consumption and sharing by the plurality of users 312A-B is captured using the audio capturing device 308. Further, the gesture recognition software recognizes the pointing gestures of the users 312A-B detected by the image capturing device 306 mounted on the display device 304. In these embodiments, the speech information related to the photograph 310 is captured based on the co-occurrence of the gesture-speech patterns.

Figure 4:
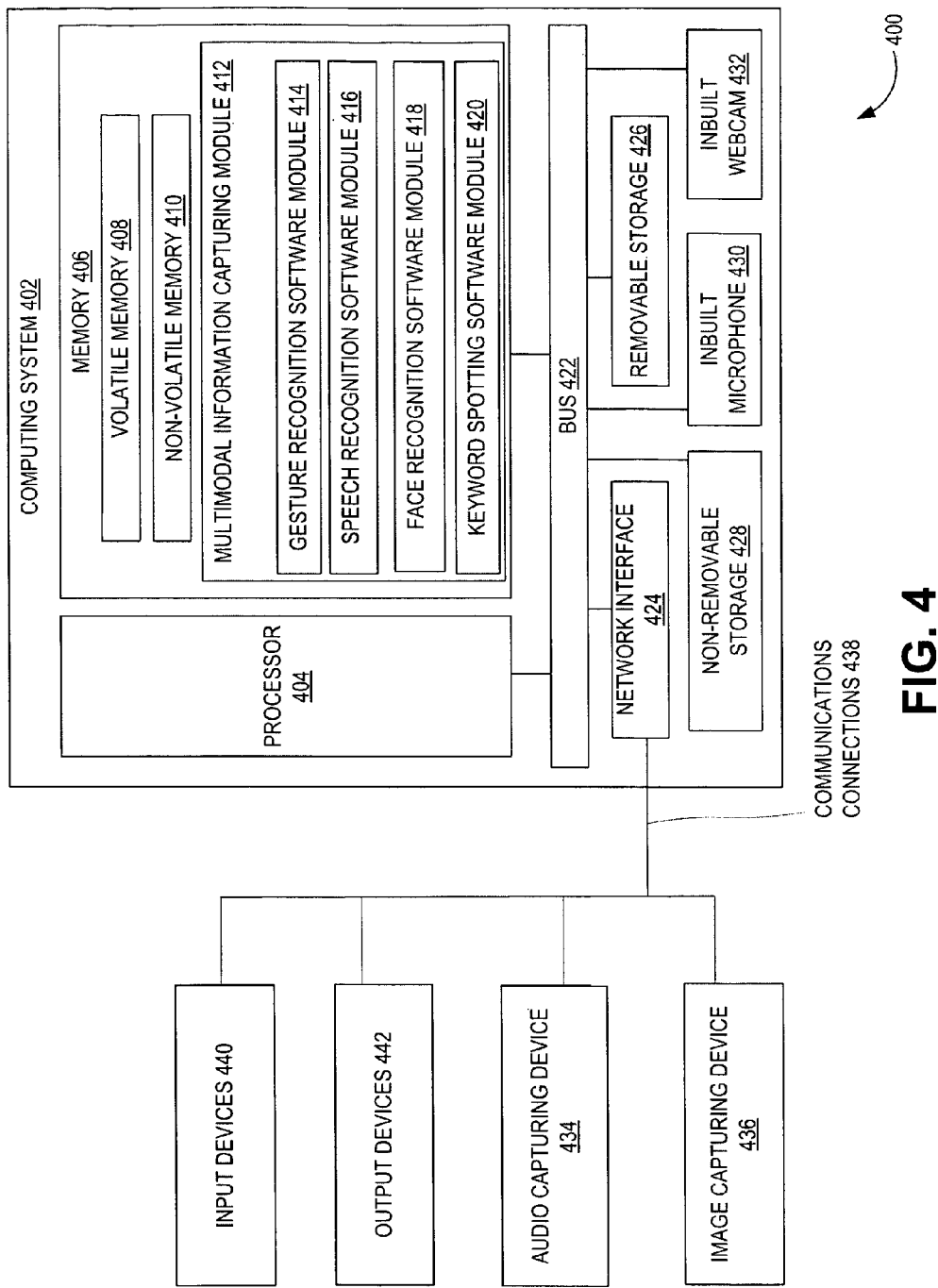
FIG. 4 illustrates an example of a suitable computing system environment for implementing embodiments of the present subject matter, according to one embodiment.

FIG. 4 shows an example of a suitable computing system environment 400 for implementing embodiments of the present subject matter. FIG. 4 and the following discussion are intended to provide a brief, general description of a suitable computing environment in which certain embodiments of the inventive concepts contained herein may be implemented.

A general computing system 402, in the form of a personal computer or a mobile device may include a processor 404, memory 406, a removable storage 426, and a non-removable storage 428. The computing system 402 additionally includes a bus 422, a network interface 424 and a webcam 432. The computing system 402 may include or have access to the computing system environment 400 that includes an audio capturing device 434, an image capturing device 436, input devices 440, output devices 442, and one or more communication connections 438 such as a network interface card 424 or a universal serial bus connection.

The one or more input devices 440 may be a digitizer screen and a stylus, trackball, keyboard, keypad, mouse, and the like. The one or more user input devices 440 may also include a mobile device having a camera. The one or more output devices 442 may be a display device of the personal computer or the mobile device. The communication connections 438 may include a local area network, a wide area network, and/or other networks.

The memory 406 may include volatile memory 408 and non-volatile memory 410. A variety of computer-readable storage media may be stored in and accessed from the memory elements of the computing system 402, such as the volatile memory 408 and the non-volatile memory 410, the removable storage 426 and the non-removable storage 428. Computer memory elements may include any suitable memory device(s) for storing data and machine-readable instructions, such as read only memory, random access memory, erasable programmable read only memory, electrically erasable programmable read only memory, hard drive, removable media drive for handling compact disks; digital video disks, diskettes, magnetic tape cartridges, memory cards, Memory Sticks™, and the like.

The processor 404, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 404 may also include embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 404 of the computing system 402. For example, a computer program may include machine-readable instructions capable of using multimodal information for media tagging, according to the teachings and herein described embodiments of the present subject matter. In one embodiment, the computer program may be included on a compact disk-read only memory (CD-ROM) and loaded from the CD-ROM to a hard drive in the non-volatile memory 410. The machine-readable instructions may cause the computing system 402 to encode according to the various embodiments of the present subject matter.

The audio capturing device 434 captures the speech information during the multimodal interactions of the plurality of users. The image capturing device 436 captures the gesture information of the plurality of users during the multimodal interactions.

As shown, the memory 406 includes a multimodal information capturing module 412. The multimodal information capturing module 412 further includes a gesture recognition software module 414, a speech recognition software module 416, a face recognition software module 418, and a keyword spotting software module 420 operating in combination for extracting relevant tags from the multimodal information for tagging the media.

In one embodiment, the system 400 includes a network, for example the communications connections 438, the processor 404 coupled to the audio capturing device 434, the image capturing device 436, the input devices 440, and the output devices 442 via the network. In these embodiments, the network may be a wireless or wired network.

Further, as described above, the memory 406 also includes the multimodal information capturing module 412 having instructions to capture multimodal information, related to media, during multimodal interactions of a plurality of users, wherein the multimodal information includes speech information and gesture information, analyze the multimodal information to identify speech portions of interest, and extract relevant tags, from the speech portions of interest, for tagging the media.

For example, the multimodal information capturing module 412 may be in the form of instructions stored on a non-transitory computer-readable storage medium. The non-transitory computer-readable storage medium having the instructions that, when executed by the computing system 402, may cause the computing system 402 to perform one or more methods described in FIGS. 1 through 4.

In various embodiments, the systems and methods described in FIG. 1 through FIG. 4 may allow users to store the most relevant tags determined by the semantics of the gesture-speech pattern cues. Hence, storage and analysis of the complete speech for the whole interaction duration is not needed. Further, multimodal cues like the semantics of gesture-speech patterns described in FIGS. 1-4 help in the rejection of speech conversations, that are not related to the media during the multimodal interaction.

Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method of using multimodal information for media tagging, comprising:
   capturing, during multimodal interactions of a plurality of users, multimodal information related to media, wherein the multimodal information comprises speech information and gesture information of the plurality of users;
   identifying an occurrence of a pre-determined keyword in the speech information;
   identifying a co-occurrence of a pre-determined gesture from the gesture information with the occurrence of the pre-determined keyword in the speech information;
   identifying a speech portion of interest in the speech information corresponding to the identified co-occurrence of the pre-determined gesture and the pre-determined keyword, wherein the speech portion of interest includes speech for a specified time duration before and after the occurrence of the identified keyword; and
   tagging the media by attaching the identified speech portion of interest to the media.

2. The method of claim 1, wherein identifying the occurrence of the pre-determined keyword in the speech information comprises:
   converting the speech information to text; and
   analyzing the text of the speech information to identify the occurrence of the pre-determined keyword.

3. The method of claim 1, wherein identifying the speech portion of interest in the speech information corresponding to the identified the co-occurrence of the pre-determined gesture and the pre-determined keyword comprises:
   maintaining a buffer window of the speech information;
   determining whether the pre-determined gesture is present in an overlapping temporal window of the occurrence of the pre-determined keyword; and in response to determining that the pre-determined gesture is present in the overlapping temporal window of the occurrence of the pre-determined keyword, identifying the speech portion of interest from the buffer window of the speech information for the specified time duration before and after the occurrence of the keyword.

4. The method of claim 1, wherein the pre-determined keyword includes one or more query keywords.

5. The method of claim 4, wherein the one or more query keywords is selected from the group consisting of what, where, who, when, this, that, he and she.

6. The method of claim 1, wherein the media comprises content selected from the group consisting of photographs, audio content, video content and text content.

7. The method of claim 1, wherein, in capturing the multimodal information during multimodal interactions of a plurality of users, the gesture information comprises at least one of:
   gesture information pointing towards the media detected by an image capturing device mounted on a display device; and
   at least one frontal face detected and recognized by the image capturing device mounted on the display device.

8. A system for using multimodal information for media tagging comprising:
   a processor; and
   memory coupled to the processor, wherein the memory includes a multimodal information capturing module having instructions, which when executed by the processor, cause the processor to:
   capture multimodal information, related to media, during multimodal interactions of a plurality of users, wherein the multimodal information comprises speech information and gesture information;
   identify an occurrence of a pre-determined keyword in the speech information;
   identify a co-occurrence of a pre-determined gesture from the gesture information with the occurrence of the pre-determined keyword in the speech information;
   identify a speech portion of interest in the speech information corresponding to the identified co-occurrence of the pre-determined gesture and the pre-determined keyword, wherein the speech portion of interest includes speech for a specified time duration before and after the occurrence of the identified keyword; and
   tag the media by attaching the identified speech portion of interest to the media.

9. The system of claim 8, further comprising an audio capturing device for capturing the speech information during the multimodal interactions of the plurality of users.

10. The system of claim 8, further comprising an image capturing device for capturing the gesture information of the plurality of users during the multimodal interactions.

11. The system of claim 8, wherein to identify the occurrence of the pre-determined keyword in the speech information, the processor is to:
   convert the speech information to text; and
   analyze the text of the speech information to identify the occurrence of the pre-determined keyword.

12. The system of claim 8, wherein the keyword includes one or more query keywords.

13. The system of claim 12, wherein the one or more query keywords is selected from the group consisting of what, where, who, when, this, that, he and she.

14. The system of claim 8, wherein to identify the speech portion of interest in the speech information corresponding to the identified the co-occurrence of the pre-determined gesture and the pre-determined keyword, the processor is to:
   maintain a buffer window of the speech information;
   determine whether the pre-determined gesture is present in an overlapping temporal window of the occurrence of the pre-determined keyword; and
   in response to the determination that the pre-determined gesture is present in the overlapping temporal window of the occurrence of the pre-determined keyword, identify the speech portion of interest from the buffer window of the speech information for the specified time duration before and after the occurrence of the keyword.

15. A non-transitory computer-readable storage medium for using multimodal information for media tagging having instructions that, when executed by a computing device, cause the computing device to:
   capture multimodal information, related to media, during multimodal interactions of a plurality of users, wherein the multimodal information comprises speech information and gesture information;
   identify an occurrence of a pre-determined keyword in the speech information;
   identify a co-occurrence of a pre-determined gesture from the gesture information with the occurrence of the pre-determined keyword in the speech information;
   identify a speech portion of interest in the speech information corresponding to the identified co-occurrence of the pre-determined gesture and the pre-determined keyword, wherein the speech portion of interest includes speech for a specified time duration before and after the occurrence of the identified keyword; and
   tag the media by attaching the identified speech portion of interest to the media.

16. The non-transitory computer-readable storage medium of claim 15, wherein to identify the occurrence of the pre-determined keyword in the speech information, the instructions are to cause the processor to:
   convert the speech information to text; and
   analyze the text of the speech information to identify the occurrence of the pre-determined keyword.

17. The non-transitory computer-readable storage medium of claim 15, wherein the keyword includes one or more query keywords.

18. The non-transitory computer-readable storage medium of claim 17, wherein the one or more query keywords is selected from the group consisting of what, where, who, when, this, that, he and she.

19. The non-transitory computer-readable storage medium of claim 15, wherein to identify the speech portion of interest in the speech information corresponding to the identified the co-occurrence of the pre-determined gesture and the pre-determined keyword, the instructions are to cause the processor to:
   maintain a buffer window of the speech information;
   determine whether the pre-determined gesture is present in an overlapping temporal window of the occurrence of the pre-determined keyword; and
   in response to the determination that the pre-determined gesture is present in the overlapping temporal window of the occurrence of the pre-determined keyword, identify the speech portion of interest from the buffer window of the speech information for the specified time duration before and after the occurrence of the keyword.

* * * * *